Oct. 8, 1968  J. E. SCHOLL  3,404,855
DOLLY GUIDE FOR CATAPULT
Filed Jan. 18, 1966  3 Sheets-Sheet 1
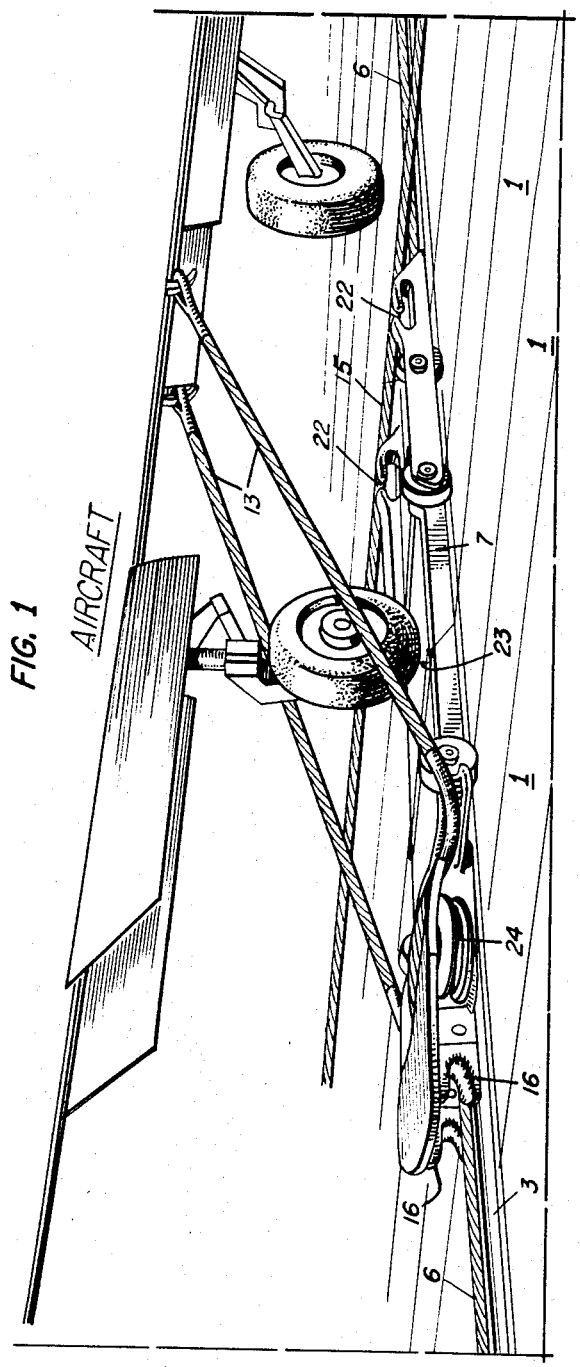
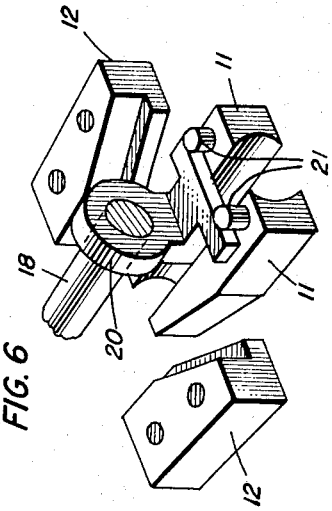
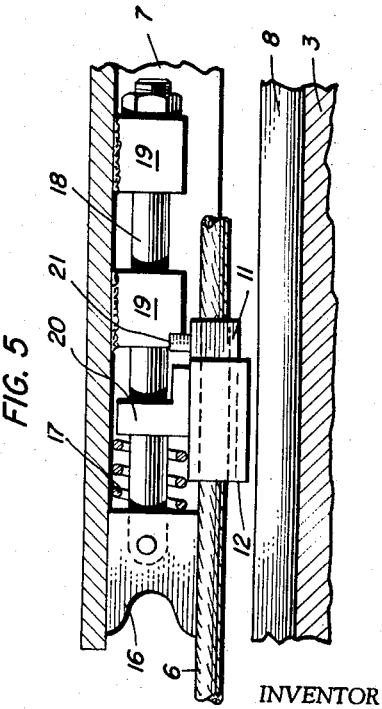
INVENTOR
JAMES E. SCHOLL
BY Claude Funkhouser
ATTORNEY

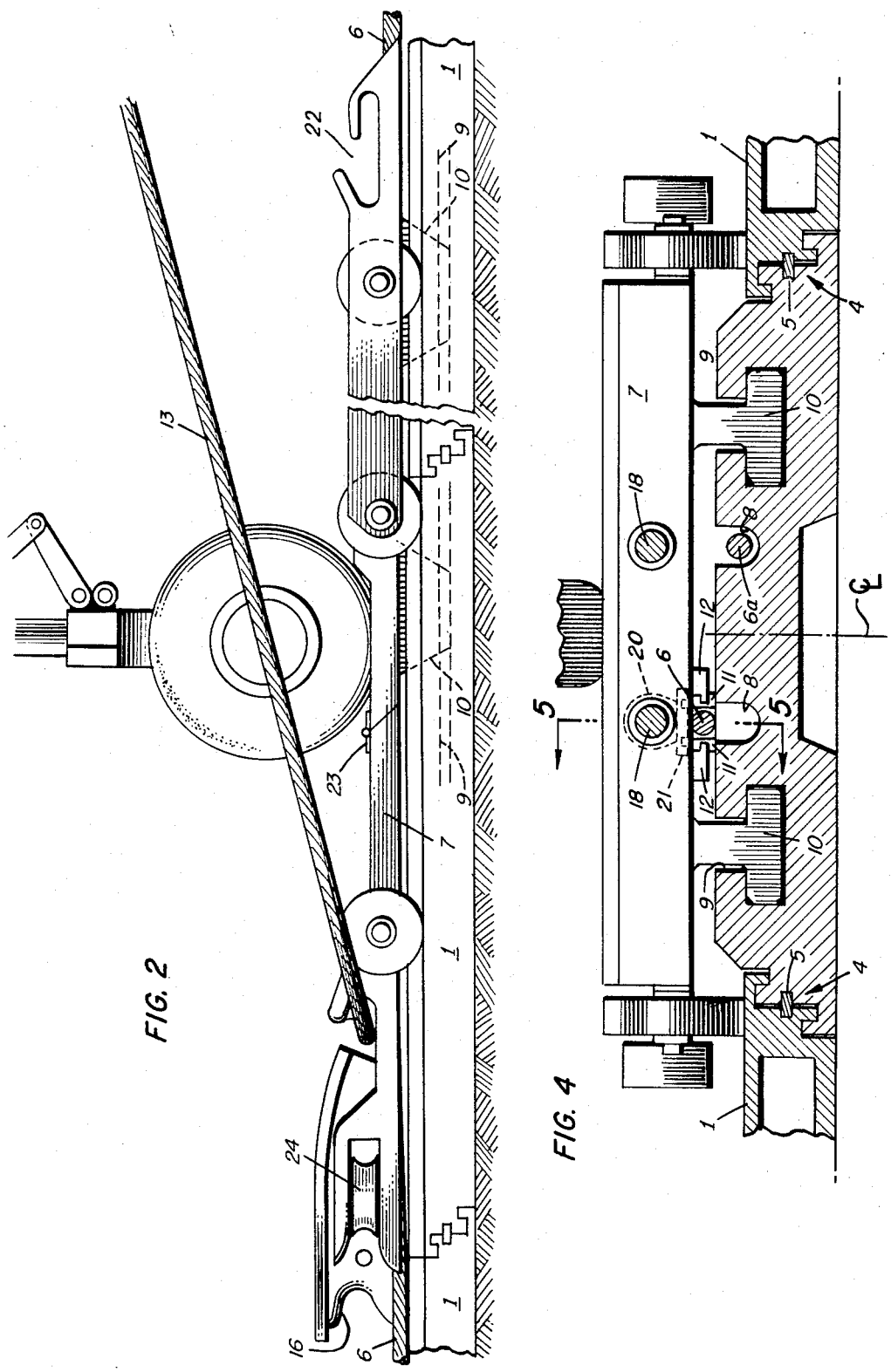

Oct. 8, 1968   J. E. SCHOLL   3,404,855

DOLLY GUIDE FOR CATAPULT

Filed Jan. 18, 1966   3 Sheets-Sheet 3

United States Patent Office 3,404,855
Patented Oct. 8, 1968

3,404,855
DOLLY GUIDE FOR CATAPULT
James E. Scholl, Fairfax, Va., assignor to the United States of America as represented by the Secretary of the Navy
Filed Jan. 18, 1966, Ser. No. 521,452
1 Claim. (Cl. 244—63)

ABSTRACT OF THE DISCLOSURE

A launching dolly for aircraft provided with a track and with endless cables moving in opposite directions. The dolly has guides designed to maintain it on a true path and also to counteract any lifting force. It is provided with cable engaging wedges and means for disengaging these wedges from the cable.

---

The invention described herein may be manufactured and used by or for the Government of the United States of America for governmental purposes without the payment of any royalties thereon or therefor.

This invention relates generally to a catapult launching system for implementing a workable Short Airfield for Tactical Support (SATS) system. More particularly, it relates to a guide for the dolly in launching aircraft from various types of catapults for the principal purpose of keeping the dolly launch in a straight line thereby guaranteeing its stability during launch, arrest and retract.

In land-based catapult systems, specifications originally required a design which employs the standard shipboard launching configuration and aircraft attachment points. Under the launching forces, this imposed a high upward launch component which had to be offset by an equal stabilizing downward component. Such a design, in land-based systems, heretofore required the use of a track guided shuttle in an endless cable system. Extensive anchoring means was necessary for securing the track to the earth or to a runway in order to compensate for the upward launch component. This required considerable work and detail in fastening and anchoring the track to the earth. Alternatively, a heavy dolly in a trackless system was proposed for purposes of balancing the upward launch component, the dolly also being towed by cable means. This was impractical because the heavy dolly is costly, must be arrested, and brought back to battery position for each launch. Also, the catapult launch efficiency is reduced considerably by the added launching weight and the dolly is highly unstable during launch at high speeds. Furthermore, neither of the above developments is capable of providing the required takeoff velocity on short airfields for modern jet aircraft loaded to capacity in addition to providing a light and simple launching means.

It is therefore an object of this invention to provide a solution to most land-based catapult problem areas including the launching of aircraft from short airfields at velocities over 200 knots.

Another object is to provide a launch mechanism which eliminates the anchors which the track system required and eliminates the dolly instability inherent in trackless systems at high speeds.

A further object of the invention is to provide a guide for the dolly in a land-based catapult system.

A still further object of the invention is to provide a dolly guide having two cable troughs, one for the launch cable, the other for the return cable, in an endless cable system which lies below the surface of the guide and surrounding landing mats.

A still further object of the invention is to provide a dolly guide in an endless cable system whereby bi-directional launching can be achieved.

Other objects, advantages and novel features of the invention will become apparent from the following detailed description of the invention when considered in conjunction with the accompanying drawings wherein:

FIG. 1 shows the aircraft in battery position bridled to the dolly;

FIG. 2 is a side view of the aircraft and dolly shown in FIG. 1;

FIG. 4 is a cross-sectional view of the dolly, dolly guide and landing mats as taken at line 4—4 of FIG. 3;

FIG. 5 is a partially shown cross-sectional view taken at lines 5—5 of FIG. 4 showing floating jaw means at the forward end of the dolly for effectuating the forward arrestment; and FIG. 6 is an exploded detail view showing the dolly-to-cable securing means after disengagement.

Figure 3:
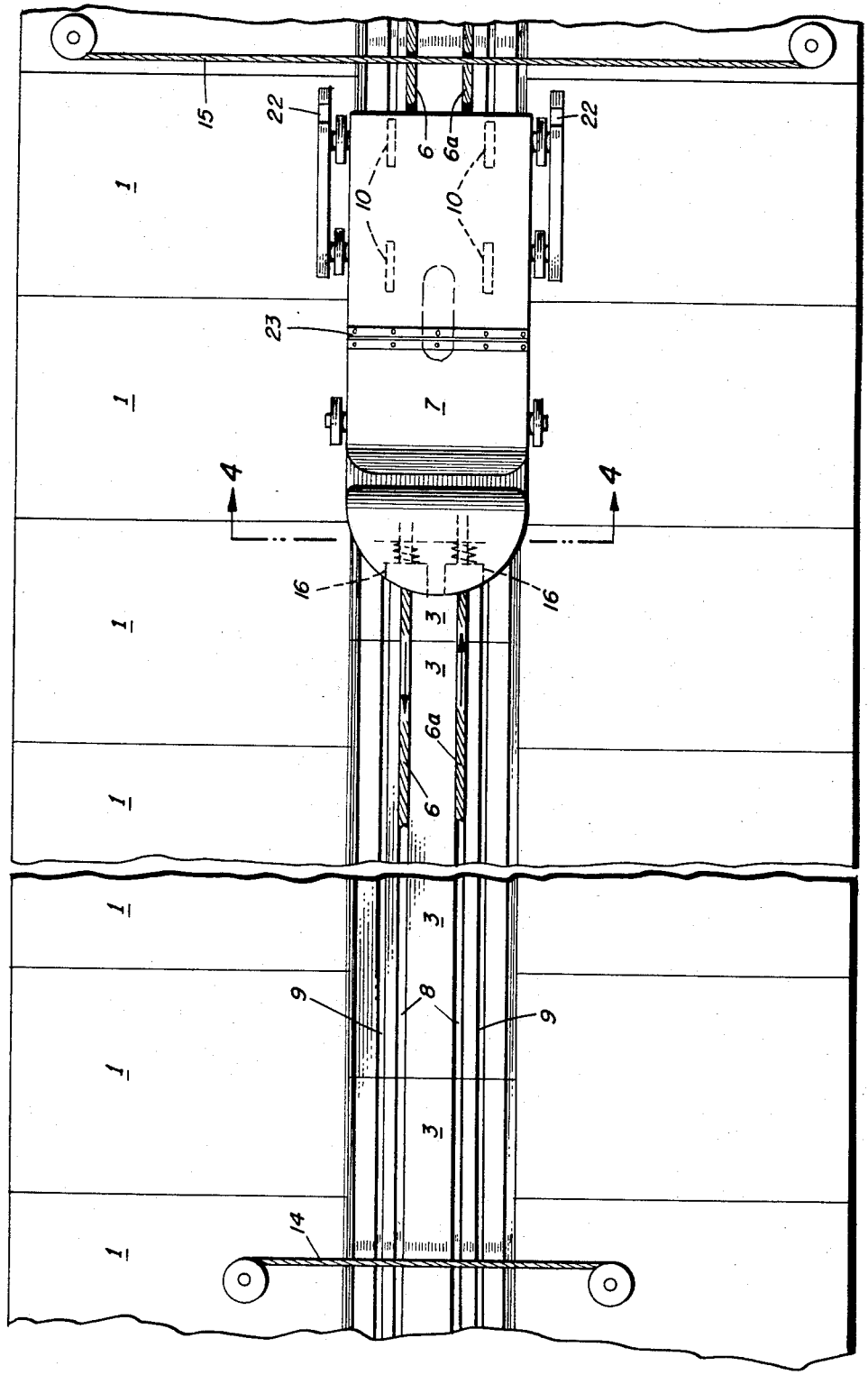
FIG. 3 is a plan view of the dolly and its surrounding landing mats revealing the tow and return cables and the forward and aft arresting cables.

Referring to the drawings, landing mat sections 1 are shown lying on ground level and interconnected in the conventional manner as at 2 in FIG. 2 with dolly guide sections 3 lying on ground level and interconnected end to end with suitable end connecting means and with a fitting along the length thereof compatible with a similar fitting on the mat as at 4 in FIG. 4. These fittings permit the interconnected mat sections to be attached to the guide and shear forces to be transmitted to the mat and guide as required by the load. Also, the mat and guide are designed to present a substantially flush deck arrangement with the guide being only slightly above the deck, as best shown in FIG. 4. At each of the interconnections 2 and 4 an elongated shear bar 5 is introduced to aid in the transmission of shear forces from one adjoining section to the other. In FIG. 3, launch cable 6 and return cable 6a are shown in an endless cable system with the cable bends, sheaves, power supply, compensator, and other operating gear, all being omitted for purposes of clarity. A dolly 7 is supported on the launching mats by dolly wheels, usually six in number. The dolly guide 3 is composed of a plurality of sections at the top surfaces of which are formed a pair of elongated troughs 8 equispaced from the dolly guide centerline, and, of a depth sufficient for the launch and return cables, respectively, to lie completely therewithin. A pair of elongated slipper slots 9, inverted T-shapes or otherwise, as desired, are also provided at the top surfaces of the guide sections respectively between the guide sides and troughs 8. It is to be noted that only one of such slots located at the guide center line, may instead be provided if desired. Dolly slippers 10, complementary in shape to the slots and secured to the underside of the dolly, fit and slide in slots 9. The slippers are attached to the dolly's underside in any conventional manner and guide the dolly during movement in both a horizontal and vertical direction. The slipper slots 9 and mating slippers 10 are shaped such that a small upload or side load on the dolly may be applied without permitting the dolly to rise off the mat more than a small tolerance or to move sidewise or laterally more than a small tolerance. With this configuration, the dolly is restrained from moving laterally or vertically more than a predetermined amount in the launch of an aircraft from battery position to the end of launch and, in return of the dolly, to battery position. The dolly is wedgingly secured to the launch cable, shown in detail in FIG. 5, by means of a pair of wedges 11 slideably journaled at the underside of the dolly and held by clamps 12 secured to the dolly as best shown in FIG. 4. These wedges 11 frictionally embrace the cable on opposite sides thereof, with movement of the dolly aftward relative to the cable always tending to improve such frictional engagement. In this system, all the cable sheaves lie flatly below the mat surface, and in this way, the cables are made to travel within their associated troughs, as shown in FIG. 3. The launch cable 6 is faired through the dolly, and because it attaches to the dolly as hereinabove described, it remains free from its underlying trough a short distance forward and aft of the dolly, as shown in FIG. 2. The return cable 6a, however, is continuously travelling in its trough during launch, in a direction opposite to launch since it is a portion of the endless cable system.

FIGS. 1, 2 and 3 show the dolly in its launch position with the aircraft attached thereto by means of a bridle or pendant 13, FIGS. 1 and 2, in the normal manner. The launch impact speed, the bridle-to-dolly angle and the details of the dolly have been designed such that, as the launching is commenced, the upward launch component is minimized thereby requiring only a small stablizing component for purposes of balancing the vertical forces. Because the weight of the dolly alone has been found to balance much of the upward launch forces, the dolly guide is prevented from lifting off the ground solely by means of its interlock with the adjoining mats. Anchoring means heretofore required are therefore eliminated.

Returning to FIG. 3, a forward arresting cable 14 is shown traversing the launch path at a predetermined distance from an aft arresting cable 15 such that dolly 7, after being towed a sufficient distance for the aircraft to become airborne, will continue on its path and be initially arrested by cable 14. Referring now to FIGS. 5 and 6, the dolly is made to decelerate as its jaws 16 make contact with cable 14 at which time springs 17 allow both jaws 16 and their associated rods 18, to respond to the forward motion by being driven aftward. Rods 18 are slideably attached to the dolly by means of a pair of axially aligned supports 19. The rod over the launch cable 6 only is provided with an L-shaped plunger 20 secured thereto and having means contacting upwardly extending wedge studs 21, as the jaws and rod are being driven rearward. Upon contact therewith, wedges 11 are dislodged from their clamps 12, as characterized in FIG. 6, whereby launch cable 6 is free to continue its forward motion until it is ultimately stopped. The arresting cable 14 being sufficiently elastic absorbs the dolly impact by stretching to a large extent thereby causing the dolly to rebound aftward until it reaches cable 15 where final arrestment occurs through the engagement of slots 22 with the cable. Sheaves 24, at either side of the forward end of the dolly, receive stretched cable 14 during arrestment thereby both stabilizing the dolly and reducing wear and strain on the cable during impact. The dolly is again made ready for launch by simply securing the launch cable thereto by means of wedges 11.

During launch, hinge 23 permits the forward end of the dolly to leave the landing mat slightly thereby acting to reduce the downward stabilizing component somewhat. The forward end recontacts the ground after the aircraft has become airborne and prior to arrestment with cable 14.

In the endless cable system of the instant invention, return cable 6a, can be utilized as a launch cable by simply rotating the dolly 180° and preparing it for launch in a direction opposite as shown, using cable 6a as a launch cable and cable 15 as the forward arresting means. It is now made obvious that, depending on tail wind direction, bi-directional launching may be made feasible without the aid of extensive change-over equipment or a large ground crew.

From the foregoing, it is apparent that the dolly guide of the instant invention eliminates the anchored track heretofore used and eliminates dolly instability inherent in the trackless system at high speeds. The guide combines the guidance which the track, incidentally, but not by design, provides (because the track is designed mainly for hold-down purposes) and the towing means which the trackless system demanded.

Because the dolly guide design presents an essentially flush deck arrangement and because the launch and return cables remain below deck level in their respective troughs, terminal impact of the aircraft arresting gear on the launch cable is eliminated and wear on the mat normally caused by the launch cable is substantially reduced. Also, the capability of improving cable lubrication is improved thereby reducing cable wear and increasing catapult capacity. Sheaves which do not protrude above deck level are also made possible and since the aircraft nose wheel rests on the dolly, tire blowout probability is greatly reduced. Furthermore, elimination of a heavy dolly tends to decrease wear on the landing mat.

Other advantages of the guide rail are better stability under high cross wind and elimination of dolly-to-aircraft center line divergence during launch whereby a reduction of runway width as compared to the dolly-cable system without a guide rail is made possible.

Obviously many modifications and variations of the present invention are possible in light of the above teachings. It is therefore to be understood that within the scope of the appended claims the invention may be practiced otherwise than as specifically described.

What is claimed is:

1. In a catapult launch system having an endless cable having a launching length and a return length for launching aircraft from short runways wherein a dolly is utilized, a mechanism carried by the dolly for engaging the endless cable comprising:

a pair of rods, each formed with a notched end mounted for sliding movement on the dolly and extending in parallel relation to the length of the dolly, and in alignment with the launching length and return length of the endless cable;

a pair of clamps secured to the underside of the dolly adjacent one of the rods and spaced on each side of the launching length of the endless cable;

a pair of wedge members formed with inward cable engaging surfaces, slidably supported on said clamps, said cable engaging surfaces adapted to engage the launching length of the endless cable to provide attachment for the dolly with the cable;

pins carried on the wedge members;

means carried by one of the rods adapted to engage the pins of the wedge members upon sliding motion of the rod;

spring means carried on one of the rods between the notched end and the pin engaging means to impart sliding motion to the rod; and arresting means adapted to engage the notched ends to stop the dolly, produce sliding motion in the rods and to engage the pins and release the wedge members from engagement with the launching length of the endless cable.

References Cited

UNITED STATES PATENTS

| 3,022,027 | 2/1962 | Keahey | 244—63 |
| 2,407,059 | 9/1946 | Crafton | 94—13 |
| 2,514,406 | 7/1950 | Maxson | 244—63 |
| 2,872,132 | 2/1959 | Doolittle | 244—63 |
| 3,301,147 | 1/1967 | Clayton et al. | 94—13 |
| 3,319,543 | 5/1967 | Braeuninger et al. | 94—13 |

MILTON BUCHLER, *Primary Examiner.*

P. E. SAUBERER, *Assistant Examiner.*